(12) United States Patent
Trimble et al.

(10) Patent No.: US 12,706,735 B2
(45) Date of Patent: Aug. 11, 2026

(54) ENCRYPTION KEY MANAGEMENT ACROSS MULTIPLE COMPUTING DEVICES

(71) Applicant: HITACHI VANTARA LLC, Santa Clara, CA (US)

(72) Inventors: Ronald Ray Trimble, Wilmington, MA (US); Dylan Alden Parker Davis, Norfolk, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 20 days.

(21) Appl. No.: 19/099,078

(22) PCT Filed: Aug. 23, 2022

(86) PCT No.: PCT/US2022/041250

§ 371 (c)(1),
(2) Date: Jan. 28, 2025

(87) PCT Pub. No.: WO2024/043877

PCT Pub. Date: Feb. 29, 2024

(65) Prior Publication Data

US 2026/0039453 A1 Feb. 5, 2026

(51) Int. Cl.
*H04L 9/08* (2006.01)
*H04L 9/14* (2006.01)
*H04L 9/12* (2006.01)

(52) U.S. Cl.
CPC .......... *H04L 9/0822* (2013.01); *H04L 9/0891* (2013.01); *H04L 9/0894* (2013.01)

(58) Field of Classification Search
None
See application file for complete search history.

(56) References Cited

U.S. PATENT DOCUMENTS

| | | | | |
|---|---|---|---|---|
| 9,628,268 | B2 * | 4/2017 | Kiang | G06F 21/6218 |
| 9,779,269 | B1 | 10/2017 | Perlman | |
| 9,830,278 | B1 * | 11/2017 | Harwood | H04L 63/061 |
| 10,819,513 | B2 * | 10/2020 | Agarwal | H04L 9/0894 |

(Continued)

OTHER PUBLICATIONS

A Cloud-Based Distributed Platform for Secured Epub Ebook Contents. Faniband et al. Warse. (Year: 2020).*

(Continued)

*Primary Examiner* — Venkat Perungavoor
(74) *Attorney, Agent, or Firm* — MATTINGLY & MALUR, PC

(57) ABSTRACT

In some examples, a first computing device of a plurality of computing devices may send, to a key management (KM) device, a request for information related to at least one of an active key encryption key (KEK) or a pre-active KEK associated with an entity. The first computing device may receive, from the KM device, an indication that the KM device does not have an active KEK or pre-active KEK. In response, the first computing device may send an instruction to the KM device for creation of a pre-active KEK for the entity. Based on subsequently determining that there are a plurality of pre-active KEKs for the entity available from the KM device, the first computing device may send an instruction to the KM device to activate the pre-active KEK having an earliest creation time, and the first computing device may receive an active KEK for the entity.

15 Claims, 7 Drawing Sheets

(56) References Cited

U.S. PATENT DOCUMENTS

| | | | | |
|---|---|---|---|---|
| 11,057,359 | B2 | 7/2021 | Wisniewski et al. | |
| 11,277,262 | B2 | 3/2022 | Powers et al. | |
| 2006/0047977 | A1 * | 3/2006 | Hanasaki | G06F 21/10 713/193 |
| 2008/0013740 | A1 | 1/2008 | Sowa et al. | |
| 2010/0303240 | A1 | 12/2010 | Beachem et al. | |
| 2014/0079221 | A1 | 3/2014 | Mccallum et al. | |
| 2018/0019976 | A1 | 1/2018 | Ben-Shalom et al. | |
| 2019/0173674 | A1 | 6/2019 | Agarwal et al. | |
| 2022/0069983 | A1 * | 3/2022 | Yoshida | H04L 9/12 |

OTHER PUBLICATIONS

International Search Report of PCT/US2022/041250 dated Jan. 4, 2023.

Written Opinion of the International Searching Authority of PCT/US2022/041250 dated Jan. 4, 2023.

* cited by examiner

400

| Key State (402) | Encryption? (404) | Decryption? (406) |
|---|---|---|
| Pre-Active (408) | No | No |
| Active (410) | Yes | Yes |
| Deactivated (412) | No | Yes, with warning |
| Compromised (414) | No | Yes, with warning |
| Destroyed (416) | No | No |
| Retired (418) | No | Yes |

FIG. 4

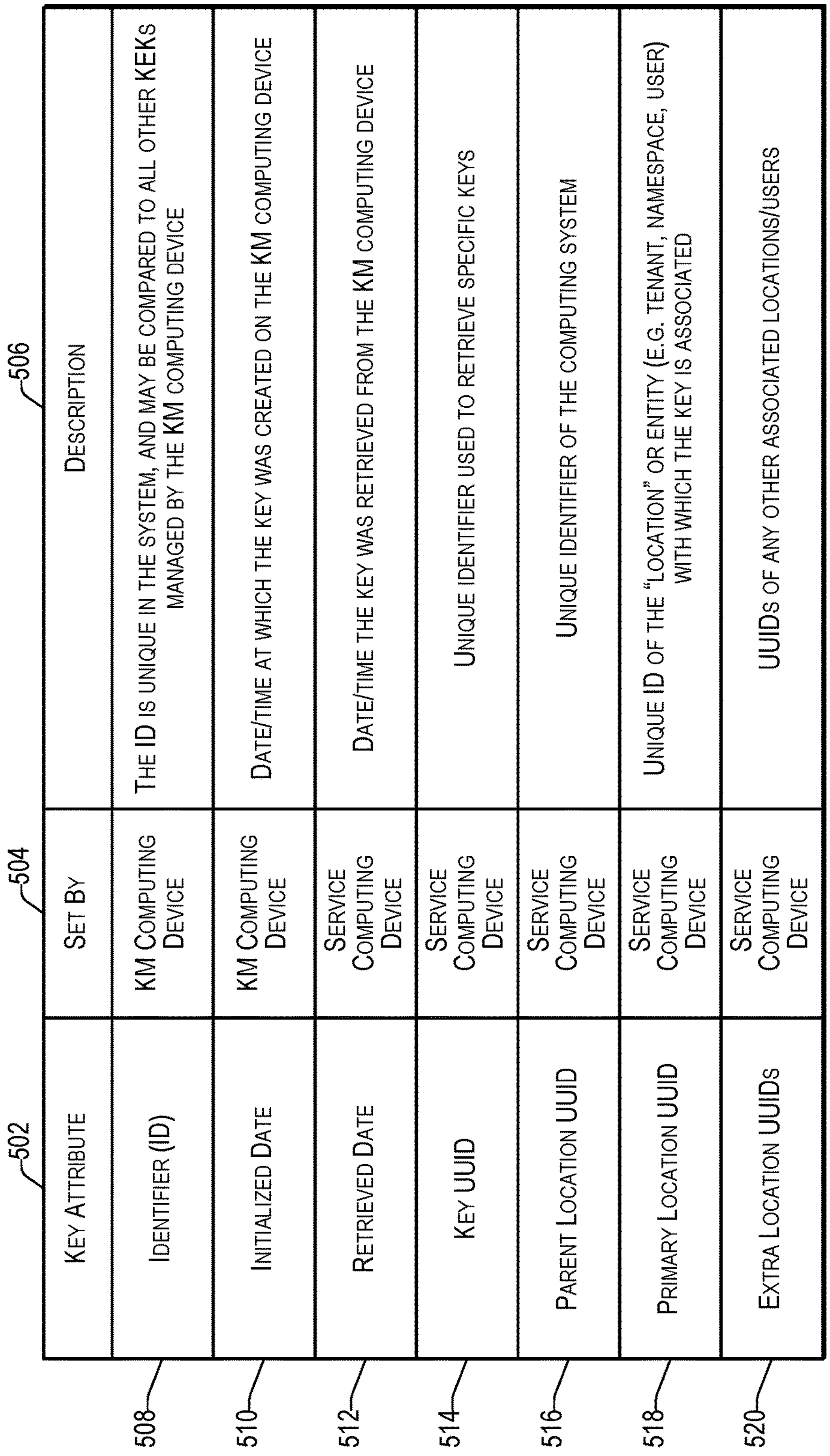

| Key Attribute | Set By | Description |
|---|---|---|
| Identifier (ID) | KM Computing Device | The ID is unique in the system, and may be compared to all other KEKs managed by the KM computing device |
| Initialized Date | KM Computing Device | Date/time at which the key was created on the KM computing device |
| Retrieved Date | Service Computing Device | Date/time the key was retrieved from the KM computing device |
| Key UUID | Service Computing Device | Unique identifier used to retrieve specific keys |
| Parent Location UUID | Service Computing Device | Unique identifier of the computing system |
| Primary Location UUID | Service Computing Device | Unique ID of the "location" or entity (e.g. tenant, namespace, user) with which the key is associated |
| Extra Location UUIDs | Service Computing Device | UUIDs of any other associated locations/users |

| Active Key Status | Use for New Data Encryption | Replace in Existing Data | Time Since Creation | Action |
|---|---|---|---|---|
| Valid | Yes | No | Up to 6 months | None |
| Rotate | Only while new key is created in background | No | 6 months to a year | If this is the ingest KEK, create a new one |
| Rekey | No | Yes | One year to a year and a half | Replace when found in an existing object |
| Expired | No | Yes | Over a year and a half | Deactivate – causes a system alert |
| Full | No | No | Under 18 months and max bytes protected reached | If this is the ingest KEK, generate a newer one |

FIG. 6

ENCRYPTION KEY MANAGEMENT ACROSS MULTIPLE COMPUTING DEVICES

TECHNICAL FIELD

This disclosure relates to the technical fields of data encryption and data storage.

BACKGROUND

Data may be encrypted and decrypted using data encryption keys. Key Management Interoperability Protocol (KMIP) is a standard by which a computing system that uses encryption keys communicates with a key management (KM) computing device for obtaining encryption keys. For instance, KMIP may provide messaging formats for simplifying management of encryption keys. As one example, keys may be created on a KM computing device and provided to the computing system that uses the keys to encrypt data. KMIP supports both symmetric and asymmetric encryption technologies. Further, under KMIP, the encryption keys may have life cycles with defined states including a pre-active state, an active state, and a deactivated state, prior to being destroyed.

In some types of computing systems, data encryption keys (DEKs) may be used to encrypt stored data. Further, the DEKs may themselves be encrypted (wrapped) using key encryption keys (KEKs) that may be used to encrypt and protect the DEKs. For example, when it is desired to decrypt particular data, a corresponding KEK may be retrieved and used to decrypt the corresponding DEK, which may then be used to decrypt the data.

Once a key is created and put into use in a computing system, the key is typically difficult to destroy or replace since there may be data encrypted in the system that requires the particular key for decryption. For instance, if a key were to be destroyed prior to decrypting the corresponding encrypted data, the encrypted data may be considered lost. However, key management and security can consume resources in the computing system. Accordingly, being able to minimize the number of keys used in the computing system while avoiding data loss would improve the operation of a computing system.

SUMMARY

In some implementations, a first computing device of a plurality of computing devices in a computing system may send, to a key management computing device, a request for information related to at least one of an active key encryption key (KEK) associated with an entity or a pre-active KEK associated with the entity. The first computing device may receive, from the key management computing device, an indication that the key management computing device does not have an active KEK or pre-active KEK associated with the entity. In response to the indication, the first computing device may send an instruction to the key management computing device for creation of a pre-active KEK for the entity. Based on subsequently determining that there are a plurality of pre-active KEKs for the entity available from the key management computing device, the first computing device may send an instruction to the key management computing device to activate the pre-active KEK having an earliest creation time, and the first computing device may receive an active KEK for the entity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example key state data structure according to some implementations.

FIG. 5 illustrates an example key attribute data structure according to some implementations.

FIG. 6 illustrates an example active key status data structure according to some implementations.

DESCRIPTION OF THE EMBODIMENTS

Figure 1:
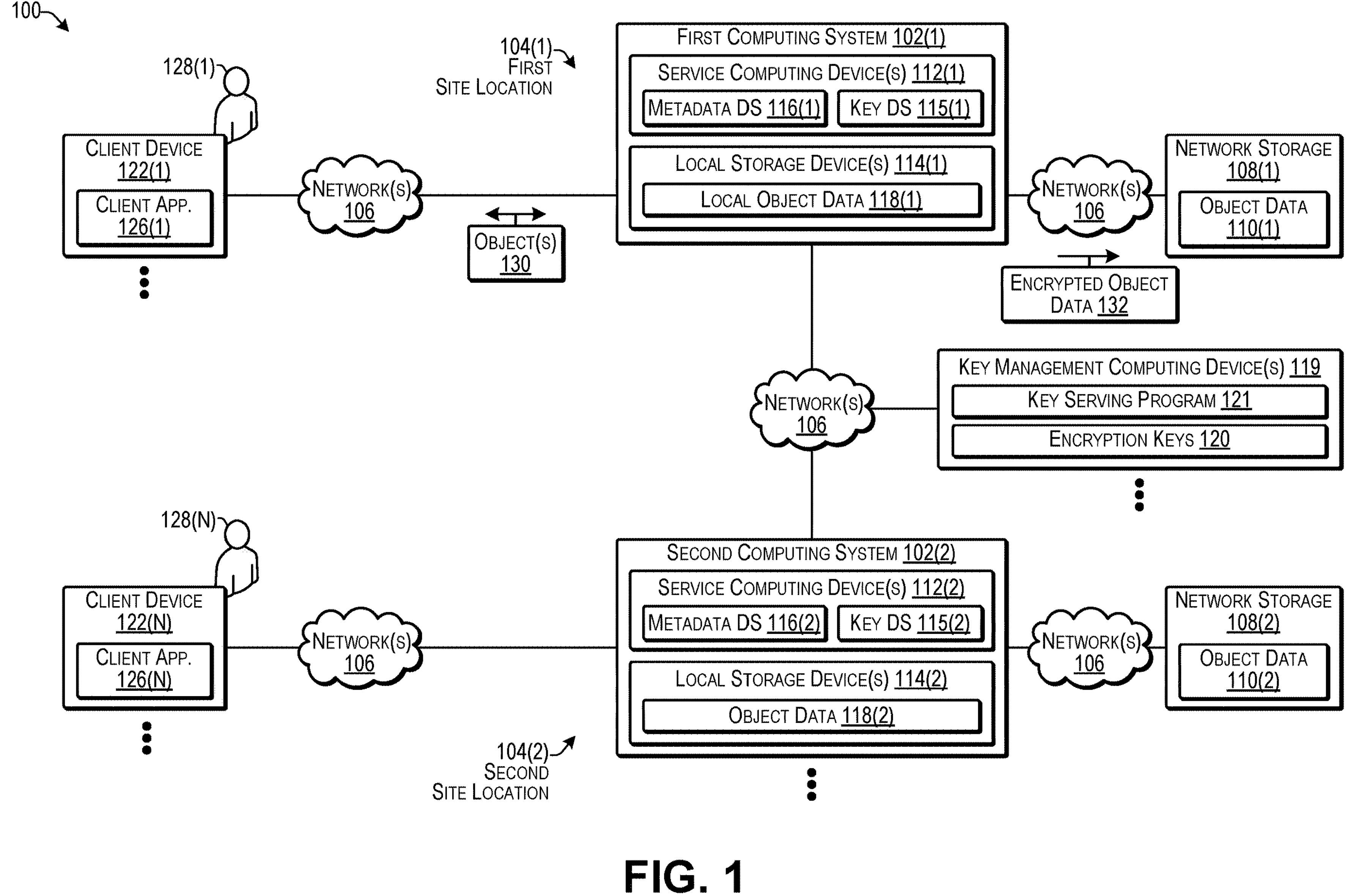
FIG. 1 illustrates an example architecture of a distributed computing system configured for encrypting and decrypting data according to some implementations.

Some implementations herein are directed to techniques and arrangements for encryption key management in a computing system, such as to minimize key encryption keys (KEKs) per entity and to maximize performance in an environment including multiple computing devices. In some examples, the computing system may minimize the number of KEKs stored on the key management (KM) computing device by allowing only one KEK to be created per user, per namespace, per tenant, or per other entity type. For example, operations based at least in part on KMIP may be used to create only one KEK even when multiple service computing devices, clusters, or other computing systems request contemporaneously (e.g., at approximately the same time and/or prior to completion of a first KEK request) a new KEK for use by a particular entity.

As one example, each service computing device involved in servicing a data request that requires a new KEK may attempt to create a KEK that matches the requirements. Further, each of the service computing devices may independently query and interact with the key management (KM) computing device in such a way that only one active KEK is generated and shared across all the service computing devices that need the KEK for use by the particular entity, while pre-active keys created during the KEK acquisition process may be destroyed. KEKs created through this process or otherwise retrieved from a KM computing device may be cached on each service computing device to mitigate the need for frequent KM computing device access.

In some examples, when a service computing device is started up, the service computing device may contact any configured KM computing devices and retrieve all keys that have a custom attribute that indicates the respective key belongs to the computing system with which the particular service computing device is associated. The retrieved keys may be stored locally, such as in a temporary memory cache or other key data structure. Once in the key data structure on the service computing device, keys may be additionally organized into several overlapping maps to optimize the efficiency of retrieving one or more keys based on certain qualifiers. Further, the key data structure enables rotation, validation, rekeying, and destruction strategies to ensure that only fresh and valid keys are used for encryption, and particularly in the case that a particular key becomes compromised.

Additionally, when the KM computing device receives a communication from one of the service computing devices included in a computing system (such as in a cluster or other type of computing system arrangement including multiple service computing devices) that results in a change to the key data structure of the service computing device, the change to the key data structure may be distributed to all the other service computing devices within the computing system, such as via indirect action of each of the other service computing devices in the computing system, or additionally, or alternatively, through direct messaging from the KM computing device or the service computing device that was the cause of the change in the key data structure to the other service computing devices. This feature limits the need for the other service computing devices to contact the KM computing device when they require a created or changed KEK.

In the examples herein, interaction between KMIP clients and a KM computing device 119 enables the number of requests from the clients to the server (i.e., from the service computing devices to the KM computing device(s)) to be minimized. Additionally, the number of KEKs that are stored on the service computing devices and the KM computing device is also minimized. For example, when a KEK is used even one time to encrypt data, then, to prevent data loss, that KEK cannot be destroyed unless that KEK is replaced by decrypting all data encryption keys (DEKs) that have been encrypted using that KEK, and re-encrypting these DEKs with the currently active replacement KEK. Further, some examples herein may minimize key-related network traffic between the service computing devices and the KM computing device(s). In addition, some examples minimize or eliminate network traffic for user-based or time-critical requests, such as through the provision of the key data structure and the key acquisition process herein.

Additionally, some examples herein provide improved security to the data itself. For example, by enforcing the usage of a different KEK for each user, namespace, tenant, or other entity, or even for each data object or other piece of data for the highest levels of protection, implementations provide an improvement over conventional techniques of using a shared KEK that might be shared across entities that do not otherwise share data. Furthermore, some examples herein do not use persistent storage outside of the KM computing device to store the KEKs, but rather only employ a key cache in a temporary memory location, or other type of temporary key data structure.

Implementation of the features herein may be complicated by the multi-node nature of the computing systems herein. For example, multiple service computing devices (sometimes referred to as "nodes") may be used concurrently to read and write data to and from storage. Consequently, all of the service computing devices in a system may need access to the same pool of keys, which might result in heavy traffic between the computing system and the KM computing device if not for provision of the multi-node key caching data structure according to the implementations herein.

Some examples herein may employ a background service to rotate KEKs on one or more of a per-object basis, a per-user basis, a per namespace basis, a per-tenant bases, or other per-entity basis, and may use metrics to determine when a particular KEK can be destroyed. For example, the processes herein may determine when a particular KEK is no longer used, such as by utilizing information obtain via KMIP, which may include an initialized date and a configured crypto period for a KEK life cycle that allows KEKs to be deactivated. The processes herein may further determine (e.g., from metrics maintained by the service computing devices) that there are no longer any DEKs that are encrypted using a particular KEK (which may be identified in the system based on the particular KEK's unique identifier). Based on the determination that there are no longer any DEKs that are encrypted using the particular KEK, the processes herein may destroy the particular KEK. Examples herein may perform these functions in a manner that does not disrupt the performance associated with user-initiated actions, such as data read or data write requests. The key rotation process herein may also provide for maintaining the ability to scavenge the objects back, such as even when the associated metadata is lost. Further, by employing different KEKs for each user, each namespace, each tenant, or each other entity type, the security of the stored data is increased, while the total number of KEKs used by the computing system may be minimized based at least on providing only one active valid KEK to meet the data protection requirements of each such entity, respectively. Some examples, may use KMIP-specific key attributes, such as "pre-active" and "active" to enable this feature in a highly performant multi-node and multi-cluster computing environment.

Some examples herein may be used in connection with the storage of data objects on storage devices, such as in arrays of storage devices. For instance, data objects, such as files or other object types, may typically include object data and object metadata. For example, the object data includes the content of the object. Further, the object metadata may include information about the object data, such as the location of the object data in a filesystem, as well as other system-generated information about the object, user-generated information about the object, and so forth.

In some implementations, each data object stored by the computing system may have its own system-unique DEK to maximize data protection by not sharing DEKs between data objects. For instance, the DEK for a respective data object may be stored with other metadata for the respective data object, or may be otherwise stored and associated with its respective data object. Additionally, in the examples herein, each DEK may be encrypted with a KEK that may be maintained in the key data structure, and that is assigned to the respective entity associated with the respective data object.

The computing system herein may use the respective KEKs to access the stored objects through their associated DEKs, respectively, while a malicious actor may be unable to use patterns between encrypted objects to crack a DEK. The computing system may assign a single KEK to each entity that stores data on the computing system. An entity may be an individual user, a tenant (e.g., an organization, a group of users, etc.) a namespace within a tenant, or an entire cluster of service computing devices. In some cases, namespaces and/or tenants may have data stored across several computing system sites that are geographically remote from each other and that may provide a replication topology, such as for disaster recovery. In some examples, a respective universally unique identifier (UUID) may be associated with each respective KEK. For example, a UUID may be unique within the computing system or a group of computing systems in communication with each other. When it is desired to decrypt stored data, the matching KEK may be retrieved based at least in part on the respective UUID, and the decrypted KEK may be used to decrypt the DEK for the data, which in turn is used to decrypt the data itself.

Conventional techniques for multi-node key creation and storage have typically relied on designating a particular node as a primary node that is responsible for communicating with a key server. This primary node may service requests from other nodes for obtaining keys from the key server. However, this arrangement may include a single point of failure that typically requires additional redundancy fall-backs should the primary node go down. For example, if a different node takes over following failure of the primary node, depending on timing, there may be inconsistencies or extraneous key server communications. On the other hand, examples herein do not designate any computing device as a master node, but rather, each service computing device is able to communicate with the KM computing device independently, and as necessary, for requesting a KEK. Consequently, the examples herein are significantly more resilient to failure, while also minimizing the number of KM computing device requests to an amount similar to the conventional techniques that employ a primary node.

For discussion purposes, some example implementations are described in the environment of one or more computing systems that utilize key encryption keys for encrypting data encryption keys used for encrypting and decrypting data. However, implementations herein are not limited to the particular examples provided, and may be extended to other types of computing system architectures, other types of storage environments, other types of client configurations, other types of data, other types of encryption keys, and so forth, as will be apparent to those of skill in the art in light of the disclosure herein.

FIG. 1 illustrates an example architecture of a distributed computing system 100 configured for encrypting and decrypting data according to some implementations. A plurality of computing systems 102 are arranged in the distributed computing system 100 at a plurality of respective computing site locations 104, such as a first computing system 102(1) located at a first site location 104(1), and a second computing system 102(2) at a second site location 104(2). Furthermore, while two computing systems 102 and computing site locations 104 are illustrated in this example, the number of computing systems 102 and computing site locations 104 in other examples is not limited to two, and may be one or more computing systems 102 at one or more respective sites 104, such as ranging between one and several hundred computing systems and sites, some or all of which may be geographically dispersed from each other. Further, in some examples, multiple computing systems 102 may be located at a single site 104, or individual computing systems 102 may be spread across multiple sites 104.

In addition, the computing systems 102 may communicate with each other over one or more networks 106, and may further communicate with respective network storage 108. For example, the first computing system 102(2) may communicate with network storage 108(1) that maintains object data 110(1) managed by the first computing system 102(1), the second computing system 102(2) may communicate with network storage 108(2) that maintains object data 110(2) managed by the second computing system 102(2). In some examples, the network storage 108 may be provided by one or more commercial cloud-based storage provider, such as AMAZON®, MICROSOFT®, IBM®, GOOGLE®, HITACHI VANTARA®, or the like, and may typically, but not necessarily, be located at a location that is remote from the first computing site 104(1) and the second computing site 104(2).

In some cases, each computing system 102 may include at least one service computing device 112 and at least one local storage device 114. Accordingly, one or more service computing devices 112(1) and one or more local storage devices 114(1) may be included at the first computing system 102(1), and one or more service computing devices 112(2) and one or more local storage devices 114(2) may be included at the second system 102(2). In some cases, the service computing device(s) 112 and the local storage device(s) 114 may be in physically separate machines. For instance, the local storage devices 114 may be incorporated into a local storage system, as discussed additionally below with respect to FIG. 2. In other examples, the local storage device(s) 114 may be incorporated into or may be otherwise included in the service computing devices(s) 112. In addition, in some examples, the service computing devices 112 of a respective computing system 102 may correspond to a computing cluster, such as a cluster of servers associated with each other. However, the computing systems 102 are not limited to the hardware configurations described and illustrated in this disclosure, but may include any suitable or desired hardware configuration able to provide data storage and perform the functions described herein, and the hardware configuration at one of the computing systems 102 may be different from that at another one of the computing systems 102 in some cases.

In some examples, individual service computing devices 112 may maintain a key data structure 115, such as a key cache, that may be a temporary key data structure maintained in a portion of memory of the respective service computing device for storing at least KEKs corresponding to data managed by the respective service computing device 112. Accordingly, the service computing device(s) 112(1) may maintain respective key data structures 115(1) including at least the KEKs corresponding to the data managed by the service computing device(s) 112(1), and the service computing devices 112(2) may maintain respective key data structures 115(2) including at least the KEKs corresponding to the data managed by the service computing devices 112(2).

In some cases, the service computing devices 112(1) and 112(2) in each computing system 102(1) and 102(2), respectively, may include, maintain, or otherwise access metadata data structures 116(1) and 116(2), respectively, that may be used to store metadata about object data 118(1), 110(1), and 118(2), 110(2), respectively, that is stored on the local storage devices(s) 114(1) and 114(2), respectively, at the respective systems 102(1) and 102(2), and the network storages 108(1) and 108(2), respectively. For example, the metadata data structure 116 may be a database, a table, or any other suitable data structure. The metadata included in the metadata data structure 116 may include information about each respective stored object, such as path, name, owner, hash value determined from the object data, the DEK used for encrypting/decrypting the stored object data, and so forth.

The computing systems 102(1) and 102(2) are able to communicate with one or more key management (KM) computing devices 119 over the one or more networks 106. For example, the KM computing device 119 may be configured to provide encryption keys 120 to the computing systems 102 according to the KMIP standard, which may include at least the KEKs discussed herein. In some cases, there may be multiple KM computing devices 119, such as to provide redundancy in the case of failure of one of the KM computing devices 119. Each KM computing device 119 may execute an instance of a key management program 121 that may manage key generation and provision of keys to the respective computing systems 102, as well as performing other key management functions, as discussed additionally below.

In addition, at least some of the service computing devices 112 are able to communicate with a plurality of client devices 122(1)-122(N) through the one or more networks 106. Each client device 122(1)-122(N) may include a respective instance of a client application 126(1)-126(N) that may execute on the respective client device 122(1)-122(N), such as for communicating with a respective service computing device 112, e.g., for sending data objects 130 for storage by the computing systems 102 and/or for retrieving data objects 130 stored by the computing systems 102. Users 128(1)-128(N) may be associated with the respective client devices 122(1)-122(N). In some cases, the client application 126 may include a browser or may operate through a browser, while in other cases, the client application 126 may include any other type of application having communication functionality enabling communication with the service computing devices 112 over the one or more networks 106.

In some cases, the users 128 and/or the client devices 122 and/or the client applications 126 may be assigned to access the service computing device(s) 112 at a particular computing site location 104 of the plurality of computing site locations 104. For example, if the first computing site location 104(1) is located in Boston, and the user 128(1) is an employee who works in the Boston area, the user 128(1) may be assigned to access the service computing device(s) 112(1), rather than the other service computing devices 112(2) at the second computing site location 104(2).

In some examples, various users 128, groups of users 128 corresponding to a namespace, tenant, or other entity, may only be granted access to certain ones of the service computing device(s) 112 at certain ones of the site locations 104, such as for load balancing, limiting employee access to the local office system, and so forth. Furthermore, while two computing systems 102(1) and 102(2) and computing site locations 104(1) and 104(2) are shown in this example, in other examples, a different number of systems/storage locations may be used, such as more than two, with the upper limit being based on practicality and diminishing returns, rather technical feasibility.

In addition, the first computing system 102(1) may be able to communicate over the one or more networks with a first network storage 108(1), and the second computing system 102(2) may be able to communicate over the one or more networks 106 with a second network storage 108(2) that is different from the first network storage 108(2). For example, the first network storage 108(1) may be geographically remote from the second network storage 108(2). In some cases, the network storages 108(1) and 108(2) may be referred to as "cloud storage" or "cloud-based storage", and may enable a lower cost storage solution per megabyte/gigabyte than the local storage systems 114. Alternatively, in other examples, the first network storage 108(1) and the second network storage 108(2) may be at the same data center, or other same geographic location.

The one or more networks 106 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 112, KM computing device(s) 119, network storages 108, and the client devices 122 are able to communicate over the one or more networks 106 using wired or wireless connections, and combinations thereof.

In the illustrated example, suppose that the first user 128(1) uses the first computing system 102(1) for storage of data objects 130. For instance, the first user 128(1) may send an object 130 to a service computing device 112(1) for storage by the first computing system 102(1). In some cases, the first computing system 102(1) may store a copy of the object 130 locally as part of the local object data 118(1). For example, the service computing device 112 may use a dedicated DEK (not shown in FIG. 1) to encrypt the object data of the data object 130 before storing the object data on the local storage devices 114(1) as part of the local object data 118(1). Additionally, or alternatively, the service computing device 112(1) may send the encrypted object data 132 of the object 130 to the network storage 108(1) for storage with the object data 110(1). Following encryption of the object data, the service computing device 112(1) may store the DEK in the metadata data structure 116(1) as part of the metadata associated with the data object 130. Furthermore, the service computing device 112(1) may encrypt the DEK using a KEK that corresponds to the first user 128(1). For example, if the first user 128(1) is associated with a tenant or other entity, then the KEK corresponding to that tenant or other entity may be used to encrypt the DEK. In other examples, the first user may be an entity that does not share data with other entities and has a KEK that is not shared with any other users. Furthermore, while additional variations are discussed below, numerous other variations will be apparent to those of skill in the art having the benefit of the disclosure herein.

In some examples, the distributed computing system 100 herein may be deployed in a geographically distributed manner, such as for data recovery and/or concurrent access purposes. Synchronous or asynchronous data replication may be employed to transfer data to one or more remote computing systems 102, such as between computing systems 102(1) and 102(2) and/or between these computing systems 102(1), 102(2), and other computing systems not shown in FIG. 1.

Figure 2:
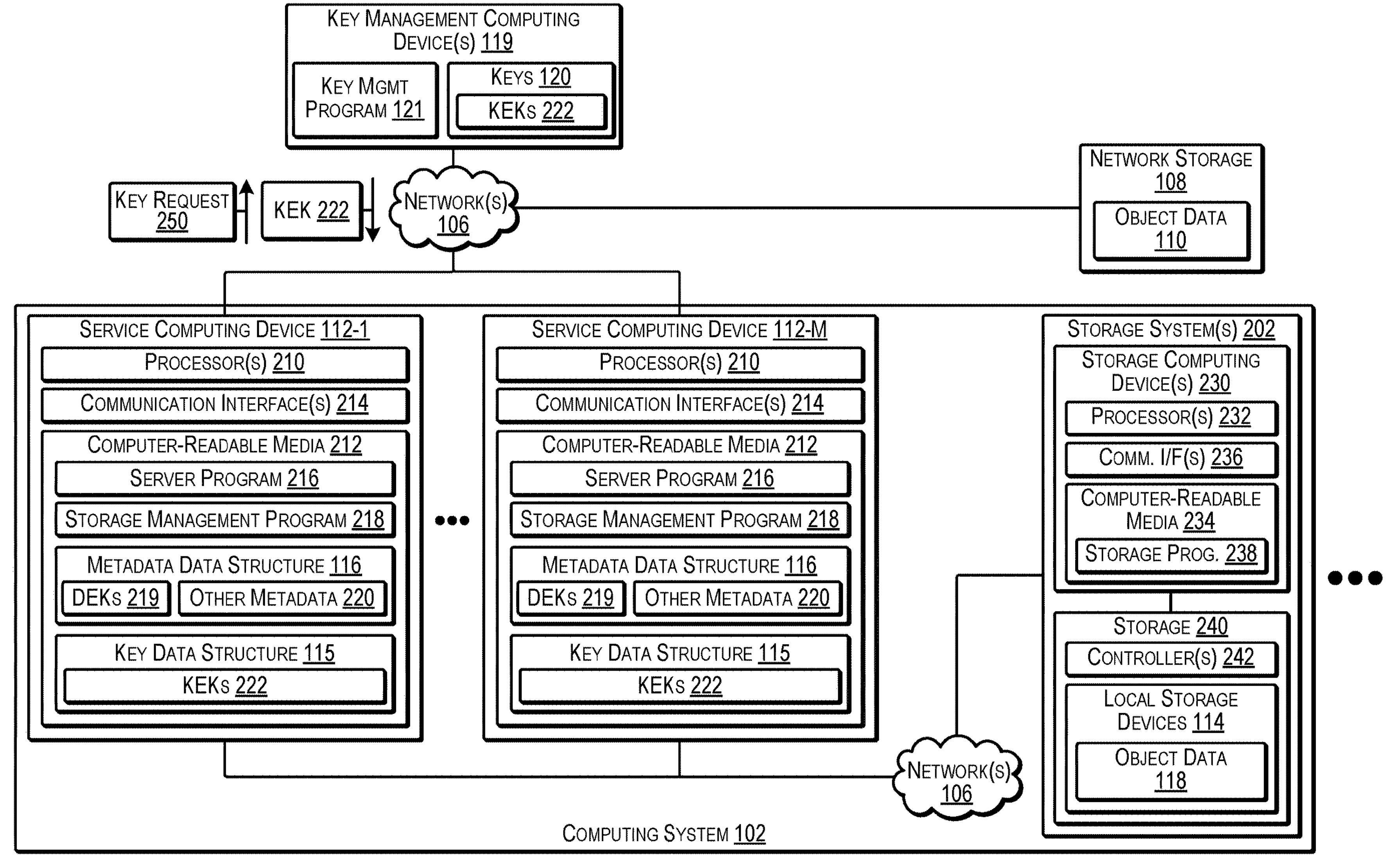
FIG. 2 illustrates select example components in an example configuration of a computing system according to some implementations.

FIG. 2 illustrates select example components in an example configuration of a computing system 102 according to some implementations. In some examples, the computing system 102 may correspond to the computing systems 102(1) and/or 102(2) discussed above with respect to FIG. 1. The computing system 102 includes a plurality of service computing devices 112-1 through 112-M (where M is a positive integer) and which may correspond to the service computing devices 112(1) and/or 112(2) discussed above with respect to FIG. 1. The service computing devices 112-1 through 112-M are able to communicate with, such as through the one or more networks 106, or are otherwise coupled to one or more storage systems 202 that may provide the local storage devices 114 in some examples. In some cases of the illustrated system, the one or more networks 106 may include a LAN, a storage area network (SAN), such as a Fibre Channel network, or the like, but implementations herein are not limited to such, and may include other types of networks, a direct connection, or the like, as discussed elsewhere herein.

In some examples, the service computing devices 112 may include one or more servers or other types of computing devices that may be embodied in any number of ways. For instance, in the case of a server, the programs, other functional components, and at least a portion of data storage may be implemented on at least one server, such as in a plurality of servers, a server farm, a data center, a cloud-hosted computing service, and so forth, although other computer architectures may additionally or alternatively be used. In the illustrated example, the service computing device 112 includes, or may have associated therewith, one or more processors 210, one or more computer-readable media 212, and one or more communication interfaces 214.

Each processor 210 may be a single processing unit or a number of processing units, and may include single or multiple computing units, or multiple processing cores. The processor(s) 210 can be implemented as one or more central processing units, microprocessors, microcomputers, microcontrollers, system-on-chip processors, digital signal processors, state machines, logic circuitries, graphics processors, and/or any devices that manipulate signals based on operational instructions. As one example, the processor(s) 210 may include one or more hardware processors and/or logic circuits of any suitable type specifically programmed or configured to execute the algorithms and processes described herein. The processor(s) 210 may be configured to fetch and execute computer-readable instructions stored in the computer-readable media 212, which may be executed to program the processor(s) 210 to perform the functions described herein.

The computer-readable media 212 may include volatile and nonvolatile memory and/or removable and non-removable media implemented in any type of technology for storage of information, such as computer-readable instructions, data structures, program modules, or other data. For example, the computer-readable media 212 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing devices 112, the computer-readable media 212 may be a tangible non-transitory medium to the extent that, when mentioned, non-transitory computer-readable media exclude media such as energy, carrier signals, electromagnetic waves, and/or signals per se. In some cases, the computer-readable media 212 may be included in the service computing devices 112, while in other examples, the computer-readable media 212 may be partially separate from the service computing devices 112. For instance, in some cases, the computer-readable media 212 may include a portion of storage in the storage system 202.

The computer-readable media 212 may be used to store any number of functional components that are executable by the processor(s) 210. In many implementations, these functional components comprise instructions or programs that are executable by the processor(s) 210 and that, when executed, specifically program the processor(s) 210 to perform the actions attributed herein to the service computing device 112. Functional components stored in the computer-readable media 212 may include a server program 216 that may communicate with the client devices such as for sending data objects to the client devices and receiving data objects from the client devices. The functional components may further include a storage management program 218, which may encrypt and store object data, store metadata for the object data, decrypt object data, and manage the KEKs and DEKs used for encryption and decryption as discussed additionally elsewhere herein. In addition, the storage management program 218 may perform other storage management functions as is known in the art. In some cases, the functional components may be stored in a storage portion of the computer-readable media 212, loaded into a local memory portion of the computer-readable media 212, and executed by the one or more processors 210.

In addition, the computer-readable media 212 may store data and data structures used for performing the functions and services described herein. For example, the computer-readable media 212 may store the metadata data structure 116, such as a metadata database, that may include DEKs 219 and other metadata 220 for the data objects stored by the computing system 102. Additionally, the computer readable media 212 may store the key data structure 115, which may include the KEKs 222, each of which may be associated with a UUID (universally unique identifier that is at least unique in the distributed computing system 100 discussed above with respect to FIG. 1). For instance, as discussed additionally below, the UUID may be used to associate a particular KEK with a particular entity and particular metadata of an object targeted for encryption or decryption. The service computing device 112 may also include or maintain other functional components and data in the computer readable media 212, which may include programs, drivers, etc., and the data used or generated by the functional components. Further, the service computing device 112 may include many other logical, programmatic, and physical components, of which those described above are merely examples that are related to the discussion herein.

The communication interface(s) 214 may include one or more interfaces and hardware components for enabling communication with various other devices, such as over the one or more network(s) 106. Thus, the communication interfaces 214 may include, or may couple to, one or more ports that provide connection for communicating with the storage system 202, and one or more ports that provide connection to the network(s) 106 for communication with the client devices 122. For example, the communication interface(s) 214 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In some examples, the storage system 202 may include one or more storage computing devices 230, which may include one or more servers or any other suitable computing device, such as any of the examples discussed above with respect to the service computing device 112. The storage computing device(s) 230 may each include one or more processors 232, one or more computer-readable media 234, and one or more communication interfaces 236. For example, the processors 232 may correspond to any of the examples discussed above with respect to the processors 210, the computer-readable media 234 may correspond to any of the examples discussed above with respect to the computer-readable media 212, and the communication interfaces 236 may correspond to any of the examples discussed above with respect to the communication interfaces 214.

In addition, the computer-readable media 234 may include a storage program 238 as a functional component executed by the one or more processors 232 for managing the storage of data on a storage 240 included in the storage system 202. The storage 240 may include one or more controllers 242 associated with the storage 240 for storing data on one or more local storage devices 114. For instance, the controller 242 may control the arrays 244, such as for configuring the arrays 244 in a RAID configuration, an erasure coded configuration, and/or any other suitable storage configuration. The local storage devices 114 may be any type of storage device, such as hard disk drives, solid state drives, optical drives, magnetic tape, combinations thereof, and so forth. Additionally, while several examples of computing systems have been described herein, numerous other systems able to implement the distributed object storage and replication techniques herein will be apparent to those of skill in the art having the benefit of the disclosure herein.

The computing system 102 may be configured to minimize the number of KEKs 222 stored on the KM computing device 119, such as by allowing only one KEK 222 to be created per entity, such as a user, namespace, tenant, or the like. For example, in some cases, data may be partitioned according to tenant. For example, tenants (e.g., organizations, companies, groups of users, etc.) typically desire not to have their data kept private and secure from other tenants. Further, different tenants may have different namespaces. A namespace may include a collection of data objects. In some cases, each namespace may include a private filesystem with respect to other namespaces. Moreover, access to one namespace of a tenant does not necessarily grant the user access to other namespaces of the tenant.

Furthermore, a tenant may be implemented as a hierarchy in that the tenant can contain subtenants. A top-level tenant may be a tenant that has no parent tenant, e.g., an enterprise, corporation, organization, or other entity. A subtenant may be a tenant whose parent is another tenant, e.g., an enterprise's financing department may be a subtenant of the top-level tenant, which is the enterprise. A default tenant may be the top-level tenant that contains only a default namespace.

Depending on the level of security desired, in some examples, a single KEK may be assigned to all data that is associated with a tenant. Alternatively, in other examples, to achieve a higher level of security, a single KEK may be assigned to data for each different namespace of a tenant, for each user associated with a tenant, or any of numerous other variations based on the rule applicable to the particular entity, such as the particular tenant, namespace, user, or the like.

In the examples herein, a process for obtaining a KEK for an entity may include multiple steps that utilize knowledge of KMIP to limit the number of KEKs that are created when multiple service computing devices 112 and/or computing systems 102 (e.g. a cluster) need a new KEK. As mentioned above, a single KEK may be created and associated with the computing system 102, or tenant, or namespace, or individual user for which it is not desirable to share a KEK with others. Initially, when a service computing device 112 is triggered to obtain a new KEK, the service computing device 112 may send a key request 250 to request, from the KM computing device 119, all active and pre-active KEKs 222 associated with the particular entity. For example, if the currently active KEK with the most recent initialized date is still valid, the service computing device 112 may use this KEK.

On the other hand, if there is not a currently active KEK or the active KEK has been compromised, the service computing device 112 may determine whether there are any pre-active KEKs. For example, a "pre-active" key that has been generated but has not yet been activated according to the KMIP standard. Activation can only be performed on a key in a pre-active state. The activation operation changes the key state to "active" and sets the activation date to the current date and time.

If there are no pre-active KEKs, the service computing device 112 may instruct the KM computing device to create one. The service computing device 112 may then again request all active and pre-active KEKs from the KM computing device, and if an active KEK with a valid recent initialized date is received, then another service computing device 112 may have caused this active KEK to be activated between the first key request and the second key request. In this case, the service computing device 112 may use the received active KEK for data encryption, and may instruct the KM computing device 119 to destroy all other pre-active KEKs on the KM computing device 119.

In other cases, if an active KEK is not received in response to the second request, the service computing device 112 may select, for activation, the pre-active KEK with the oldest initialized date. For example, by implementing a rule that requires selection of the oldest initialized date, the algorithm ensures that any other service computing devices 112 that may also be concurrently attempting to create a valid active KEK will detect and select the same pre-active KEK. Accordingly, the service computing device 112 may send an instruction for KM computing device 119 to activate the selected pre-active KEK on the KM computing device 119. If this instruction fails, it may be assumed that another service computing device 112 has already activated the selected KEK, and the service computing device 112 may then send a request to get the now active KEK from the KM computing device 119 based on the identifier of the KEK and its active state.

On the other hand, if there is no activated KEK at this point, the create operation has failed. Thus, the service computing device 112 may instruct the KM computing device 119 to not remove any pre-active KEKs and to avoid more steps. As another alternative, the service computing device 112 may repeat the foregoing operations when the KM computing device 119 is available. On the other hand, when an active KEK has been successfully created, the KM computing device 119 may be instructed to distribute the activated KEK to all the other service computing devices 112 in the computing system 102 for inclusion in the key data structure of each of the service computing devices 112 so that the other service computing devices 112 do not need to contact the KM computing device 119 when a valid active KEK is needed for the particular entity. Furthermore, following activation of the KEK, any other pre-active KEKs that may have been created may be destroyed.

As mentioned above, service computing device 112 may include the key data structure 115, which may be in the form of a cache in memory, or the like, that keeps previously used KEKs 222 in-memory so that each service computing device 112 does not have to contact the key management computing device 119 when a particular KEK is required. As one example, when each individual service computing device 112 starts up, the service computing device 112 may contact any configured KM computing devices 119, and may retrieve all keys that have a custom attribute ("x-User-Parent-Location-UUID") that associates that KEK 222 with the particular computing system 102 of which the service computing device 112 is a member or otherwise associated with. Each service computing device 112 maintains a copy of these KEKs 222 in the key data structure 115 for use when responding to a client request that involves one of the KEKs 222.

In the key data structure 115, the KEKs 222 may be organized into several overlapping maps to improve the efficiency of retrieving one or more keys based on certain qualifiers. These internal key data structure maps may include a mapping of key UUID to the corresponding KEK, which is a primary mapping of a KEK's UUID to the KEK object itself, enabling quick lookup of a specific KEK based on UUID. Furthermore, the UUID(s) retrieved from other maps may be used with this map to retrieve the specific KEK for encryption/decryption purposes.

In addition, the key data structure 115 may include a mapping of the "location" (e.g., the entity, such as a tenant, namespace, or user with which the key is associated) UUID and the KM computing device name to an active KEK UUID that is currently being used for ingest, which allows a lookup of key UUIDs to be performed based on the combination of location/entity associated with the KEK and the KM computing device 119 that is maintaining the particular KEK. The information may be used to determine the particular KEK 222 that is currently being used to encrypt newly ingested data objects for the specified entity and KM computing device combination.

Furthermore, the key data structure 115 may include a mapping of the computing system UUID and the computing system type to the set of all KEK UUIDs. This enables tracking of all KEKs that are associated with a particular computing system 102, including both the current ingest keys and previously used keys. Additionally, the key data structure 115 may include a mapping of the KM computing device name to the set of ingest KEK UUIDs that enables tracking of all active KEKs currently designated to be used for ingest and associated with a KM computing device. Additional mappings may include a mapping of the KM computing device name to the set of all KEK UUIDS to enable tracking of all KEKs associated with a particular KM computing device 119. Furthermore, while several example mappings are set forth above, numerous variations will be apparent to those of skill in the art having the benefit of the disclosure herein.

The service computing devices 112 herein may enforce a KEK validation, rotation, and deactivation policy, which may be performed by a module executed by execution of the storage management program 218 or other suitable program. For example, accepted security best practices discourage use of the same encryption key for an indefinite period, as breaches or other lapses in security may occur, and the key may become accessible to a third party or otherwise may be compromised. For instance, three time periods may be configurable by an administrator or the like. A crypto period may be a configurable total amount of time that a KEK is expected to be able to be used, such as, e.g., 18 months or other desired time period. Following expiration of the crypto period, the KEK may be deactivated. A deactivated key may still be used for decryption, but an alert may be sent to an administrator or other user when a deactivated key needs to be used, such as for providing an indication to the administrator that rekeying of the deactivated key has not been fully completed and may need to be reviewed.

In some examples herein, the crypto period may be divided into three distinct periods, namely (1) a valid period during which the KEK is used for encrypting DEKs for newly ingested data; (2) a rotation period following the valid period during which the KEK is retired, is no longer used during ingestion, and is replaced by a newly activated KEK, but rekeying has not yet started; and (3) a rekeying period during which DEKs that have been encrypted by the KEK are decrypted and re-encrypted using a newer KEK. As one example, each of these 3 periods may be 6 months, and thus, the total crypto period may be 18 months, but any of these times may be configured differently by an administrator or a user having sufficient system privileges.

The rekey period should be sufficiently long enough to ensure that all DEKs that have been encrypted using the KEK are unwrapped and then re-encrypted using the most recent or current active KEK of the respective entity. Following expiration of the rekey period (and the crypto period), the KEK may be deactivated. As mentioned above, after a KEK is deactivated, the deactivated KEK may be maintained for an additional period of time (e.g., an amount of time for ensuring that there are no objects that have associated DEKs that are still encrypted with the deactivated KEK) during which the deactivated KEK may still be used for decrypting DEKs if any DEKs are located that are still wrapped with that particular deactivated KEK. When this situation occurs, an alert may be sent to an administrator or other user to provide notification that the rekeying process may not have been fully completed and should be reviewed. In some cases, the KEK may be automatically deactivated after expiration of the rekey period (e.g., final 6 months) or the crypto period (e.g., 18 months). If the KEK is still in use when the KEK is deactivated, an alert may be generated; otherwise, the KEK may be destroyed. In some examples, any unused deactivated KEK may be destroyed. Further, in some examples, there may be administrative processes that can deactivate or compromise a KEK before the crypto period expires.

To help limit the impact should a KEK become compromised, the KEKs herein may be rotated and replaced at regular intervals. Examples herein may implement this policy through the provision of a configurable rotation period value that may be checked against a key's creation date (also referred to as the key's "initial date") on the KM computing device 119 when an active KEK is retrieved from the key data structure 115 for use as an ingest key for a particular entity. When the time comes for an active KEK to be rotated, the particular KEK may be marked as, or otherwise indicated to be "Retired", and is no longer used to encrypt DEKs for ingested data. The retired KEK may still be used to decrypt DEKs for decrypting data that was previously encrypted using that KEK and DEK combination. A new KEK may be created/activated and used in place of the retired/rotated KEK.

Additionally, a separate procedure may be performed to "validate" each KEK once per configurable validation period (e.g., every 24 hours or other desired time period). For example, validating a KEK may involve retrieving an updated version of the KEK from the KM computing device 119 to ensure that the key data structure 115 has a fresh version of each KEK. Should the updated version of the KEK need to be retired or deactivated, appropriate actions may then be taken locally.

Examples herein may also implement KEK re-keying and destruction policies. For instance, the storage management program 218 or other suitable program executed on the individual service computing devices 112 may include an internal background service that continually investigates objects to determine whether a corresponding DEK should be re-encrypted with a new KEK to replace a retired KEK.

In some examples, when the KEK's lifetime reaches the rotation period, the KEK may be retired and replaced by a new active KEK, which may then be used for object ingest during its valid period. During the rekeying period, the retired KEK may be replaced by the current active KEK. To replace a KEK, a currently examined DEK may be read by decrypting/unwrapping the DEK with the corresponding retired KEK, and the DEK may then be re-encrypted (re-wrapped) using the currently active KEK. The rewrapped DEK is associated with the same object metadata as previously for use in future decryption of the respective object data, and the system metrics may be updated for disaster recovery. The background service may, at certain intervals, check all KEKs maintained by all configured KM computing devices 119. Any KEKs 222, whether they are currently active, or otherwise, that have reached the specified rotation period may be rotated, retired, and at the end of the rekeying period, deactivated before eventually being destroyed. Accordingly, the policy implemented herein aims to replace all KEKs before the crypto period expires for the respective KEK. Any KEKs that are no longer used by any objects and are not active may be destroyed. However, a KM computing device itself cannot be retired unless all the KEKs on that KM computing device have been destroyed.

The service computing devices 112 may communicate with each other, such as for providing information related to key cache updates, or other information related to the KEKs. According to the implementations herein, any delays in responding to customer requests for data may be minimized by ensuring that the KEKs 222 are available on any service computing device that may be requested to service the customer request. Additionally, any KM computing device contact that results in cache changes may be distributed to all the service computing devices 112. This function keeps the other service computing devices from needing to contact the KM computing device when it is desired to use a created or changed KEK, or when a KEK's rotation period has expired. In some cases, the KM computing device 119 is contacted during ingest. As one example, this may occur when a request is made to replace the KEK or the KEK is marked as having been compromised. In those situations, the cache distribution request does not wait for a KM computing device response. Additionally, when an existing KEK is validated (e.g., every 24 hours), the result is distributed by the service computing device to the other service computing devices to prevent them from unnecessarily contacting the KM computing device to validate the same KEKs as well.

In the examples herein the background KEK creation and validation is not impacted by contacting a KM computing device 119 during the ingestion of user data. For example, a background task may be used to create a new active KEK or to validate an active KEK to use for ingesting data for a particular entity. The current valid active KEK may be used while the background task is executed to prepare for future operations with a new or updated KEK.

In the examples herein, a single KEK may be quickly generated for a user across multiple service computing devices 112 and multiple computing systems 102. No inter-node messages or additional communications with the users or client computing devices are required. Further, only one active KEK is generated regardless of how many nodes may concurrently request activation of a KEK for a particular entity, which minimizes the number of KEKs generated per entity. In addition, in some examples, background processes may be executed to maintain consistency of the KEKs 222 in the key data structure 115 without interrupting user requests. For example, requests to the KM computing device 119 may be performed in the background, such as when the key rotation process determines that a KEK is ready to be rotated and retired. An active KEK that results from the KM computing device operations may be distributed to all the service computing devices 112 upon completion, rather than having each service computing device 112 wait to ask for the new/updated KEK on an as-needed basis, such as following receipt of a user data request.

Additionally, implementations herein may maximize data protection by employing a unique DEK for every respective stored object, while minimizing the number KEKs that the KM computing device 119 needs to supply to the service computing devices 112, such as by using only one KEK per data sharing entity. Furthermore, the provision of the key data structure 115 on each service computing device 112 may also serve to minimize network traffic between the service computing devices 112 and between the service computing devices 112 and the KM computing device(s) 119. As mentioned above, the key data structure includes a plurality of internal maps that enable the correct KEK or set of KEKs to be quickly accessed in memory at each service computing device 112. Numerous other advantages and benefits of the implementations herein will be apparent to those of skill in the art.

Figure 3:
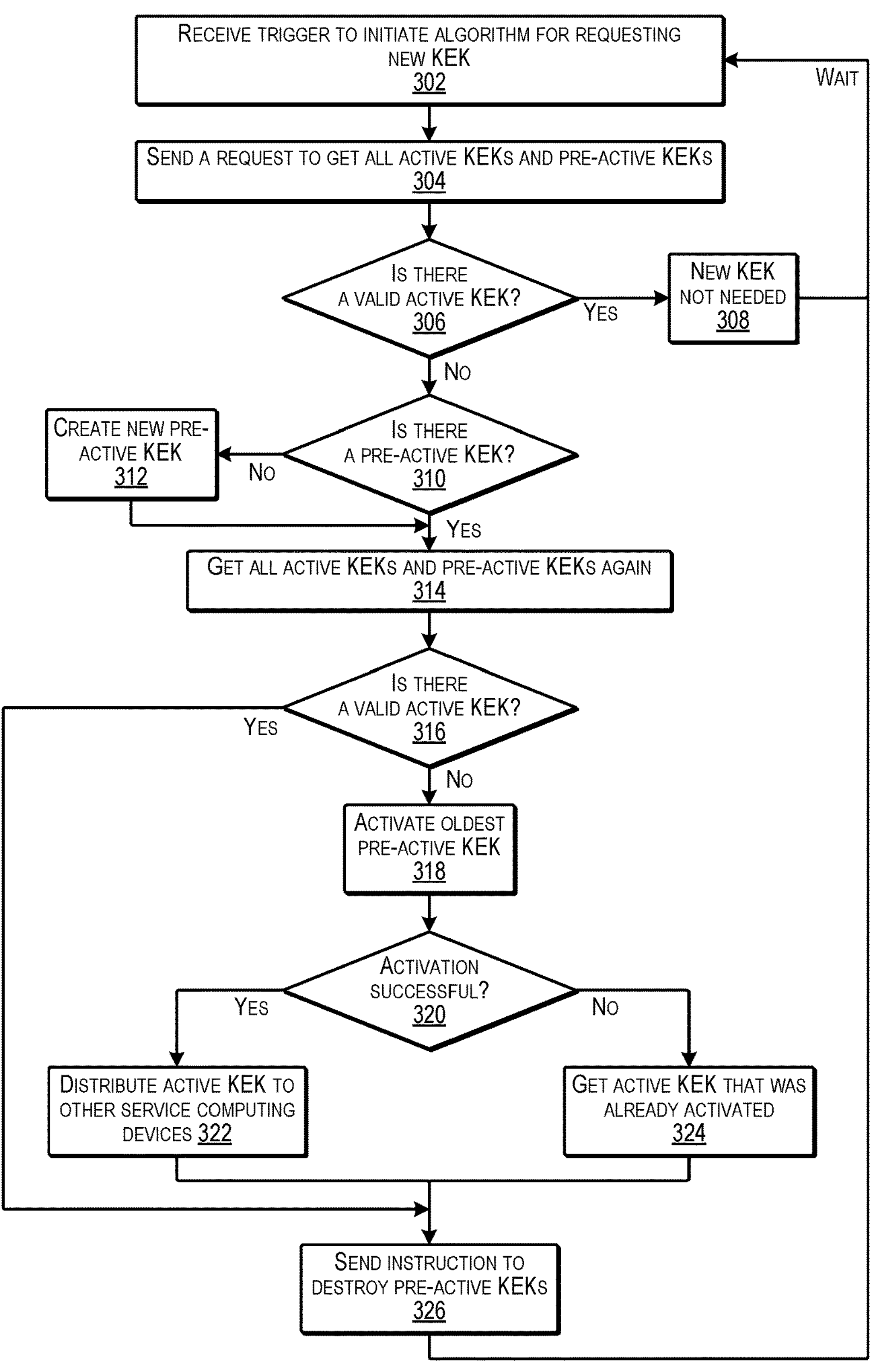
FIG. 3 is a flow diagram illustrating an example process for acquiring an active key according to some implementations.

FIG. 3 is a flow diagram illustrating an example process 300 for acquiring an active key according to some implementations. The process is illustrated as collections of blocks in a logical flow diagram, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In some cases, the process 300 may be executed at least in part by one or more of the service computing devices 112, or other computing device(s) in one or more of the computing systems 102, such as in the distributed computing system 100 discussed above with respect to FIG. 1.

At 302, the computing system may detect or otherwise receive a trigger to initiate the process 300 for acquiring a new active KEK for an entity. As one example, the computing device may receive a data request for an entity for which the computing device does not have an active KEK. As another example, the computing device may determine that the current active KEK should be retired and that a new active KEK should be obtained.

At 304, the computing device may send a request to the KM computing device to get all active KEKs and pre-active KEKs for the particular entity. For example, the computing device may send, to the key management computing device, a request for information related to at least one of any active KEK associated with the particular entity or any pre-active KEK associated with the entity.

At 306, the computing device may determine whether a valid active KEK was received in response to the request. If so, the process goes to 308. If not, the process goes to 310.

At 308, when a valid active KEK is returned, the computing device may determine that a new KEK is not needed, and the process may return to 302 to wait for a next trigger event.

At 310, when a valid active KEK is not returned in response to the first request, the computing device may determine whether a pre-active KEK was returned. For example, a pre-active KEK is a KEK that may have already been created but has not yet been activated. If not, the process goes to 312. If so, the process goes to 314.

At 312, when a pre-active KEK is not returned, the computing device may send an instruction to the KM computing device to create a pre-active KEK.

At 314 the computing device may send a second request to the KM computing device to get all active KEKs and pre-active KEKs. This second request may help to determine whether another service computing device has caused an active KEK to already be created slightly in advance of the current process.

At 316, the computing device may determine whether a valid active KEK was returned in response to the second request. If so, the process goes to 326. If not, the process goes to 318.

At 318, the computing device may send an instruction to the KM computing device to activate the oldest pre-active KEK. This rule may cause all service computing devices that may be concurrently attempting to obtain an active KEK for a particular entity to select the same pre-active KEK for activation and thereby avoid creating more than one active KEK for the entity.

At 320, the computing device may determine whether an active KEK was created in response to the instruction. If so, the process goes to 322. If not, the process goes to 324.

At 322, when the active KEK was created in response to the instruction, the computing device may distribute the active KEK to the other service computing devices in the computing system.

At 324, the computing device may send a request to the KM computing device to get the active KEK that was already activated by another service computing device before the computing device requested activation. Alternatively, the computing device may receive the active KEK directly from another one of the service computing devices that was successful in requesting creation of the active KEK.

At 326, the computing device may send an instruction to the KM computing device to request that the KM computing device destroy any pre-active KEKs that may still remain, and the process may return to 302 to wait for a next trigger event.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

FIG. 4 illustrates an example key state data structure 400 according to some implementations. In this example, the key state data structure 400 includes a key state column 402, an encryption capability column 404, and a decryption capability column 406. As indicated at 408, when a key is in a pre-active state, the key is not permitted to be used for encryption, as indicated at 404, and is not permitted to be used for decryption, as indicated at 406. As indicated at 410, when a key is in an active state, the key may be used for encryption, as indicated at 404, and may be used for decryption, as indicated at 406. As indicated at 412, when a key is deactivated, the key may not be used for encryption, but may still be used for decryption, and a warning or other alert may be sent to an administrator if the key is used for decryption. As indicated at 414, when a key is compromised, the key may not be used for encryption, but may be used for decryption, and a warning may be sent to an administrator if the key is used for decryption. As indicated at 416, when a key is destroyed, the key cannot be used for encryption or decryption. As indicated at 418, when a key is retired, the key is not permitted to be used for encryption, but can still be used for decryption, and does not require a warning to be sent to the administrator.

FIG. 5 illustrates an example key attribute data structure 500 according to some implementations. In this example, the key attribute data structure 500 includes a key attribute column 502, a "set by" column 504, and a description column 506. As indicated at 508, an identifier (ID) may be set by the KM computing device, as indicated at 504, and may be an ID that uniquely identifies the particular key to the KM computing device 119 withing the system. As indicated at 510, an initialized date attribute may be set by the KM computing device, and may be a date and time at which the KM computing device created the particular key. As indicated at 512, a retrieved time may be the date and time at which the key was first retrieved by one of the service computing devices in the computing system from the KM computing device.

As indicated at 514, a UUID attribute may be created by a service computing device that may assign the UUID to a key, and the UUID may be a unique identifier within the system (or other individually distinguishable ID) that may be used to retrieve the specific key, such as from the key data structure 115. As indicated at 516, a parent location UUID may be a unique identifier within the system (or other individually distinguishable ID) that is created by a service computing device to identify the computing system 102 that uses the key. As indicated at 518, the primary location UUID may be a unique identifier within the system (or other individually distinguishable ID) that is created by a service computing device to identify an entity (e.g. tenant, namespace, user) with which the key is associated. As indicated at 520, the extra location UUID may be a unique ID within the system (or other individually distinguishable ID) that is created by a service computing device to associate a key with any additional associated users, tenants, namespaces, or the like.

FIG. 6 illustrates an example active key status data structure 600 according to some implementations. In this example, the active key status data structure 600 includes an "active key status" column 602, a "use for new data encryption" column 604, a "replace in existing data" column 606, a "time since creation" column 608, and an "action" column 610. As discussed above with respect to FIG. 4, an "active"

key may be a KEK that is currently used for both encryption of DEKs and decryption of DEKs for a corresponding entity. As indicated at 612, when the key is in its valid period, e.g., during the first 6 months (or other configurable time period) after activation, the key may be used to encrypt DEKs for new data, as indicated in column 604, and it is not necessary to replace the key or take other actions.

As indicated at 614, when the key has reached the rotation period, the key is retired and is not used to encrypt new data unless a new active KEK is not yet available (i.e., is being retrieved from the KM computing device). The KEK may enter the rotation status at a user-configurable time (e.g., 6 months to a year after activation), at which point the valid period for the key ends and the KEK is no longer "active". At the end of the rotation period, the rekey status begins.

As indicated at 616, when the key status moves to rekey, the KEK is still not permitted to be used for encryption in relation to new data, but may be used for decryption to replace the KEK with the most recent active KEK. For example, when an encrypted DEK encrypted using the KEK is found, the KEK is replaced by decrypting the DEK and re-encrypting the DEK using the most recent active KEK.

As indicated at 618, when the key status changes to expired, e.g., at the end of the rekeying period, which also corresponds to the end of the crypto period, the KEK is deactivated, but is not yet destroyed since destruction might lead to data loss. If a DEK that is still encrypted with the deactivated KEK is located, the KEK is needed to decrypt the DEK and an alert is sent to an administrator to inform the administrator that the deactivated KEK is needed to decrypt a DEK, which may be indicative that the rekeying process for that KEK was not fully completed.

As indicated at 620, when the key status is "full", the key is not used for further encryption. The full status indicates that a maximum bytes protection threshold has been reached for this particular KEK and that a new KEK should be activated to protect additional DEKs for additional data. For example, there may be a threshold maximum amount of data that each KEK is permitted to be used to access, and when that threshold is reached, a new KEK may be activated, regardless of whether the KEK currently being used is still in a valid state.

Figure 7:
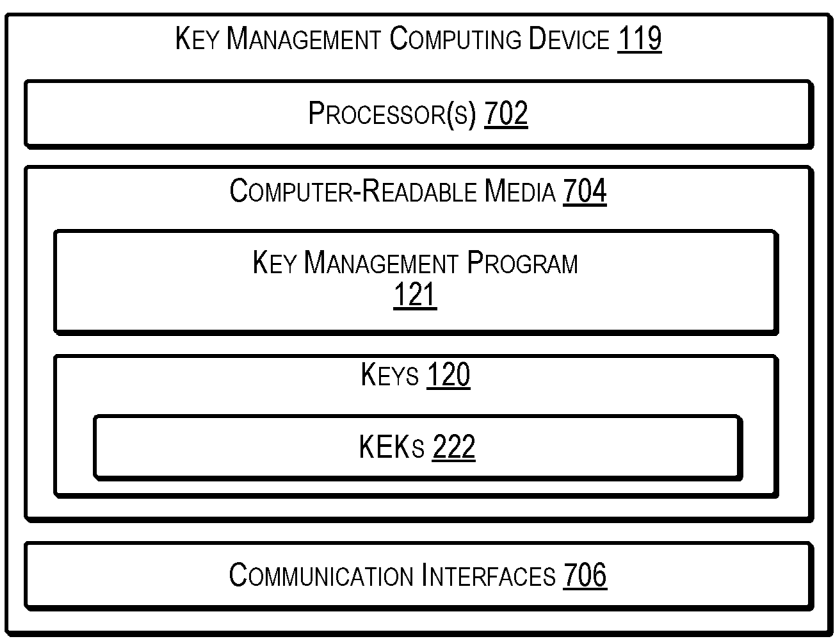
FIG. 7 illustrates select example components of one or more KM computing devices according to some implementations.

FIG. 7 illustrates select example components of one or more KM computing devices 119 according to some implementations. The KM computing device(s) 119 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple KM computing device(s) 119 may be located together or separately, and organized, for example, as servers, virtual servers, server banks, and/or server farms. The described functionality may be provided by the servers of a single entity or enterprise, or may be provided by the servers and/or services of multiple different entities or enterprises.

In the illustrated example, a KM computing device 119 includes, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more central processing units, microprocessors, microcomputers, microcontrollers, system-on-chip processors, digital signal processors, graphics processing units, state machines, logic circuitries, and/or any devices that manipulate signals based on operational instructions. As one example, the processor(s) 702 may include one or more hardware processors and/or logic circuits of any suitable type specifically programmed or configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. For example, the computer-readable media 704 may include, but is not limited to, RAM, ROM, EEPROM, flash memory or other memory technology, optical storage, solid state storage, magnetic tape, and magnetic disk storage, network or cloud storage, array storage, network attached storage, a storage area network, or any other medium that can be used to store the desired information and that can be accessed by a computing device. Depending on the configuration of the KM computing device 119, the computer-readable media 704 may be a tangible non-transitory medium to the extent that, when mentioned, non-transitory computer-readable media exclude media such as energy, carrier signals, electromagnetic waves, and/or signals per se. In some cases, the computer-readable media 704 may be at the same location as the KM computing device 119, while in other examples, the computer-readable media 704 may be partially remote from the KM computing device 119.

The computer-readable media 704 may be used to store any number of functional components that are executable by the processor(s) 702. In many implementations, these functional components comprise instructions or programs that are executable by the processor(s) 702 and that, when executed, specifically program the processor(s) 702 to perform the actions attributed herein to the KM computing device(s) 119. Functional components stored in the computer-readable media 704 may include the key management program 121, which may include one or more computer programs, applications, executable code, or portions thereof.

In addition, the computer-readable media 704 may store data, data structures, and other information used for performing the functions and services described herein. For example, the computer-readable media 704 may store the keys 120, including the KEKs 222. The KM computing device 119 may also include or maintain other functional components and data, which may include programs, drivers, etc., and the data used or generated by the functional components. Further, the KM computing device 119 may include many other logical, programmatic, and physical components, of which those described above are merely examples that are related to the discussion herein.

The one or more communication interfaces 706 may include one or more software and hardware components for enabling communication with various other devices, such as over the one or more network(s) 106. For example, the communication interface(s) 706 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, scripts, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:

a computing system having a plurality of computing devices able to communicate over a network with a key management computing device, wherein a first computing device of the plurality of computing devices is configured by executable instructions to perform operations comprising:

sending, to the key management computing device, a request for information related to at least one of an active key encryption key (KEK) associated with an entity or a pre-active KEK associated with the entity;

receiving, from the key management computing device, an indication that the key management computing device does not have an active KEK or pre-active KEK associated with the entity;

in response to the indication, sending an instruction to the key management computing device for creation of a pre-active KEK for the entity;

based on subsequently determining that there are a plurality of pre-active KEKs for the entity available from the key management computing device, sending an instruction to the key management computing device to activate the pre-active KEK having an earliest creation time; and receiving an active KEK for the entity.

2. The system as recited in claim 1, the operations further comprising receiving the active KEK from the key management computing device and an indication that activation of the active KEK was performed successfully.

3. The system as recited in claim 1, wherein the active KEK for the entity is received from a second computing device of the plurality of computing devices.

4. The system as recited in claim 3, the operations further comprising receiving an indication that the instruction for activation of the pre-active KEK was unsuccessful based at least on the second computing device of the plurality of computing devices requesting activation of the pre-active KEK having the earliest creation time before the instruction was received from the first computing device.

5. The system as recited in claim 1, the operations further comprising sending, to the key management computing device, an instruction to destroy any remaining pre-active KEKs corresponding to the entity.

6. The system as recited in claim 1, the operations further comprising periodically receiving the active KEK associated with the entity and a plurality of other active KEKs associated with other entities, from at least one of the key management computing device or one of the plurality of computing devices.

7. The system as recited in claim 1, the operations further comprising, following expiration of a first amount of time, retiring the active KEK associated with the entity and requesting, from the key management computing device, a new active KEK associated with the entity.

8. The system as recited in claim 7, wherein the operation of retiring the active KEK permits the retired KEK to be used for decryption of a previously encrypted data encryption key (DEK), but not for encryption of a DEK.

9. The system as recited in claim 7, the operations further comprising, following expiration of a second amount of time using the retired KEK to decrypt previously encrypted data encryption keys (DEKs) and re-encrypting the DEKs with a current active KEK associated with the entity.

10. The system as recited in claim 9, the operations further comprising, following expiration of a third among of time, deactivating the retired KEK, wherein following deactivation, an alert is sent to a user based on the deactivated KEK being needed to decrypt a DEK that was previously encrypted using the now deactivated KEK.

11. The system as recited in claim 1, the operations further comprising:

storing the active KEK in a data structure including a plurality of active KEKs; and associating each active KEK with a respective individually distinguishable identifier (ID) in the data structure.

12. A method comprising:

sending, by a computing device, to a key management computing device, a request for information related to at least one of an active key encryption key (KEK) associated with an entity or a pre-active KEK associated with the entity, wherein the computing device is one of a plurality of computing devices included in a computing system configured to store object data;

receiving, from the key management computing device, an indication that the key management computing device does not have an active KEK or pre-active KEK associated with the entity;

in response to the indication, sending an instruction to the key management computing device for creation of a pre-active KEK for the entity;

based on subsequently determining that there are a plurality of pre-active KEKs for the entity available from the key management computing device, sending an instruction to the key management computing device to activate the pre-active KEK having an earliest creation time; and receiving an active KEK for the entity.

13. The method as recited in claim 12, further comprising receiving the active KEK from the key management computing device and an indication that activation of the active KEK was performed successfully.

14. One or more non-transitory computer-readable media storing one or more programs executable by a first computing device of a plurality of computing devices in a computing system to configure the first computing device to perform operations comprising:

sending, to a key management computing device, a request for information related to at least one of an active key encryption key (KEK) associated with an entity or a pre-active KEK associated with the entity;

receiving, from the key management computing device, an indication that the key management computing device does not have an active KEK or pre-active KEK associated with the entity;

in response to the indication, sending an instruction to the key management computing device for creation of a pre-active KEK for the entity;

based on subsequently determining that there are a plurality of pre-active KEKs for the entity available from the key management computing device, sending an instruction to the key management computing device to activate the pre-active KEK having an earliest creation time; and receiving an active KEK for the entity.

15. The one or more non-transitory computer-readable media as recited in claim 14, the operations further comprising receiving the active KEK from the key management computing device and an indication that activation of the active KEK was performed successfully.

* * * * *